(12) United States Patent
Son et al.

(10) Patent No.: US 9,791,030 B2
(45) Date of Patent: Oct. 17, 2017

(54) CIRCUIT FOR CONTROLLING HYDRAULIC PRESSURE OF TORQUE CONVERTER

(71) Applicant: Hyundai Motor Company, Seoul (KR)

(72) Inventors: Hyunjun Son, Seoul (KR); Joohang Lee, Yongin-si (KR); Sunghoon Park, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 58 days.

(21) Appl. No.: 14/564,819

(22) Filed: Dec. 9, 2014

(65) Prior Publication Data

US 2016/0003335 A1   Jan. 7, 2016

(30) Foreign Application Priority Data

Jul. 1, 2014   (KR) ........................ 10-2014-0082017

(51) Int. Cl.
*F16H 61/14*   (2006.01)
*F16H 45/02*   (2006.01)

(52) U.S. Cl.
CPC ........... *F16H 45/02* (2013.01); *F16H 61/143* (2013.01); *F16H 2045/021* (2013.01); *F16H 2045/0215* (2013.01)

(58) Field of Classification Search
CPC ................................................ F16H 2045/021
See application file for complete search history.

(56) References Cited

U.S. PATENT DOCUMENTS

| | | | | |
|---|---|---|---|---|
| 6,511,400 B2* | 1/2003 | Kimura | ................. | F16H 61/061 |
| | | | | 477/117 |
| 6,662,918 B2* | 12/2003 | Takeuchi | ................ | F16H 45/02 |
| | | | | 192/103 R |
| 9,022,191 B2* | 5/2015 | Jinno | .................... | F16H 61/143 |
| | | | | 192/3.29 |
| 2006/0032720 A1* | 2/2006 | Ando | .................... | F16H 61/143 |
| | | | | 192/3.3 |

(Continued)

FOREIGN PATENT DOCUMENTS

| | | |
|---|---|---|
| JP | 2009-052643 A | 3/2009 |
| JP | 2012-197870 A | 10/2012 |
| KR | 10-2013-0065410 A | 6/2013 |

*Primary Examiner* — Ramya Burgess
*Assistant Examiner* — Lillian Nguyen
(74) *Attorney, Agent, or Firm* — Morgan, Lewis & Bockius LLP

(57) ABSTRACT

A circuit for controlling hydraulic pressure of a torque converter that includes an engagement hydraulic pressure chamber independently installed in a fluid operation chamber enclosed by a front cover and an impeller and having engagement hydraulic pressure supplied to engage a lock-up clutch may include a torque converter control valve stably decreasing line pressure and supplying the decreased line pressure as operation hydraulic pressure of the torque converter, a torque converter pressure control valve controlled by a linear solenoid valve to control D range pressure and supply the controlled D range pressure to the engagement hydraulic pressure chamber, and a lock-up switch valve controlled by the linear solenoid valve to supply the hydraulic pressure supplied from the torque converter control valve (Continued)

as control pressure of the torque converter pressure control valve and supply exhaust hydraulic pressure of the torque converter as control pressure of the torque converter control valve.

12 Claims, 2 Drawing Sheets

(56) References Cited

U.S. PATENT DOCUMENTS

| | | | | |
|---|---|---|---|---|
| 2009/0065318 A1* | 3/2009 | Soga | ................... | F16H 61/0021 |
| | | | | 192/3.29 |
| 2009/0139815 A1* | 6/2009 | Frait | ..................... | F16H 61/143 |
| | | | | 192/3.29 |
| 2012/0000740 A1* | 1/2012 | Shimizu | ................ | F16H 61/143 |
| | | | | 192/3.3 |
| 2012/0073924 A1* | 3/2012 | Fukatsu | .............. | F16H 61/0206 |
| | | | | 192/3.3 |
| 2012/0247899 A1* | 10/2012 | Jinno | ................... | F16H 61/143 |
| | | | | 192/3.3 |
| 2013/0146156 A1* | 6/2013 | Son | ....................... | F16H 61/143 |
| | | | | 137/505 |
| 2014/0097056 A1* | 4/2014 | Son | ....................... | F16H 61/143 |
| | | | | 192/3.29 |

* cited by examiner

CIRCUIT FOR CONTROLLING HYDRAULIC PRESSURE OF TORQUE CONVERTER

CROSS-REFERENCE TO RELATED APPLICATION

The present application claims priority of Korean Patent Application Number 10-2014-0082017 filed on Jul. 1, 2014, the entire contents of which are incorporated herein for all purposes by this reference.

BACKGROUND OF THE INVENTION

Field of the Invention

The present invention relates to a circuit for controlling hydraulic pressure of a torque converter applied to an automatic transmission for a vehicle. More particularly, the present invention relates to a circuit for controlling hydraulic pressure of a torque converter capable of improving an engagement response feature of a lock-up clutch embedded in a torque converter for a 3-way separate chamber multi-plate clutch structure.

Description of the Related Art

Since a torque converter applied to a vehicle transfers a torque by rotating a turbine using a fluid as a medium, it has a disadvantage in that a torque may not be fully transferred in a general friction clutch. Therefore, the torque converter includes a lock-up clutch that may directly transfer the torque mechanically in a high speed region.

The lock-up clutch is disposed in a space part formed between a front cover, which is an input side rotating member of the torque converter, and a turbine, which is an output side rotating member of the torque converter, and is controlled so as to be operated or so as not to be operated by hydraulic pressure supplied to a hydraulic pressure chamber for engagement of the lock-up clutch.

In addition, the hydraulic pressure supplied to the hydraulic pressure chamber for engagement of the lock-up clutch is controlled by a torque converter control valve and a linear solenoid valve. Recently, the hydraulic pressure supplied to the hydraulic pressure chamber for engagement of the lock-up clutch has been directly controlled using the linear solenoid valve.

However, in the case in which the lock-up clutch is controlled using the linear solenoid valve as described above, an operation control of the lock-up clutch is controlled regardless of hydraulic pressure in the torque converter. Therefore, in the case in which the hydraulic pressure in the torque converter is large, the operation control of the lock-up clutch becomes slow, such that stability in controlling the lock-up clutch is decreased.

The information disclosed in this Background section is only for enhancement of understanding of the general background of the invention and should not be taken as an acknowledgement or any form of suggestion that this information forms the prior art already known to a person skilled in the art.

SUMMARY OF THE INVENTION

The present invention has been made in an effort to provide a circuit for controlling hydraulic pressure of a torque converter having advantages of improving an engagement response feature of a lock-up clutch by controlling operation hydraulic pressure of the lock-up clutch while receiving fed-back exhaust hydraulic pressure of the torque converter at the time of controlling an operation of the lock-up clutch embedded in the torque converter.

Various aspects of the present invention provide a circuit for controlling hydraulic pressure of a torque converter that includes an engagement hydraulic pressure chamber independently installed in a fluid operation chamber enclosed by a front cover and an impeller and having engagement hydraulic pressure supplied thereto in order to engage a lock-up clutch. The circuit may include: a torque converter control valve stably decreasing line pressure and supplying the decreased line pressure as operation hydraulic pressure of the torque converter; a torque converter pressure control valve controlled by a linear solenoid valve to control D range pressure and supply the controlled D range pressure to the engagement hydraulic pressure chamber; and a lock-up switch valve controlled by the linear solenoid valve to supply the hydraulic pressure supplied from the torque converter control valve as control pressure of the torque converter pressure control valve and supply exhaust hydraulic pressure of the torque converter as control pressure of the torque converter control valve.

The torque converter control valve may be configured to exhaust a portion of the line pressure, stably adjust the hydraulic pressure to supply the operation hydraulic pressure of the torque converter, and receive fed-back exhaust hydraulic pressure of the torque converter at the time of controlling the engagement of the lock-up clutch to decrease supply hydraulic pressure of the torque converter.

The torque converter control valve may include a valve body including a first port having the line pressure supplied thereto, a second port supplying hydraulic pressure supplied to the first port to the lock-up switch valve, a third port supplying the hydraulic pressure supplied to the first port to the lock-up switch valve and the torque converter, a fourth port receiving the hydraulic pressure supplied to the second port as control pressure, a fifth port receiving the exhaust hydraulic pressure of the torque converter from the lock-up switch valve, and a sixth port exhausting the hydraulic pressure supplied to the first port; and a valve spool embedded in the valve body and adjusting an opening area of the sixth port by moving laterally depending on a magnitude of control pressure supplied to the fourth and fifth ports.

The linear solenoid valve may be configured to be of a normal closed type.

The torque converter pressure control valve may be configured to be controlled by control pressure supplied from the linear solenoid valve to control engagement and disengagement pressure of the lock-up clutch and receive fed-back supply hydraulic pressure of the torque converter at the time of controlling the engagement of the lock-up clutch to control engagement hydraulic pressure of the lock-up clutch.

The torque converter pressure control valve may include: a valve body including a first port having the D range pressure supplied thereto, a second port supplying hydraulic pressure supplied to the first port to the engagement hydraulic pressure chamber, a third port receiving the hydraulic pressure supplied to the second port as control pressure, a fourth port receiving control pressure of the linear solenoid valve at an opposite side to the third port, a fifth port receiving supply hydraulic pressure of the torque converter as control pressure from the lock-up switch valve, and an exhaust port selectively exhausting the hydraulic pressure of the second port; and a valve spool embedded in the valve body and controlled by the control pressure of the linear solenoid valve and the supply hydraulic pressure of the torque converter to adjust an opening area of the first port, thereby controlling engagement hydraulic pressure of the lock-up clutch supplied to the engagement hydraulic pressure chamber.

The lock-up switch valve may include: a valve body including first and second ports receiving the hydraulic from the torque converter pressure control valve, a third port supplying the hydraulic pressure supplied to the first port as the control pressure of the torque converter pressure control valve, a fourth port receiving the exhaust hydraulic pressure of the torque converter, a fifth port selectively supplying the hydraulic pressure supplied to the fourth port and the hydraulic pressure supplied to the second port to a cooling and lubricating part, a sixth port supplying the hydraulic pressure supplied to the fourth port as the control pressure of the torque converter control valve, and a seventh port receiving control pressure of the linear solenoid valve; and a valve spool embedded in the valve body and controlled by the control pressure of the linear solenoid valve to allow the first port to communicate with the third port, allow the second port to communicate with the fifth port, and allow the fourth port to communicate with the sixth port, or allow the first port to communicate with the second port and allow the fourth port to communicate with the fifth port.

A circuit for controlling hydraulic pressure of a torque converter according to various aspects of the present invention, which is to control a lock-up clutch of a torque converter having a 3-way separate chamber structure, is configured so that an engagement pressure supply channel or chamber of the lock-up clutch is independently configured without being connected to another channel, such that it may be controlled by a linear solenoid valve and a torque converter pressure control valve.

In addition, exhaust hydraulic pressure of the torque converter is supplied as control pressure to the torque converter control valve at the time of controlling the lock-up clutch, thereby making it possible to lower supply hydraulic pressure of the torque converter. When the supply pressure of the torque converter is lowered as described herein, engagement pressure of the lock-up clutch may also be lowered, such that an engagement response feature of the lock-up clutch may be improved.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION OF THE EMBODIMENTS

Figure 1:
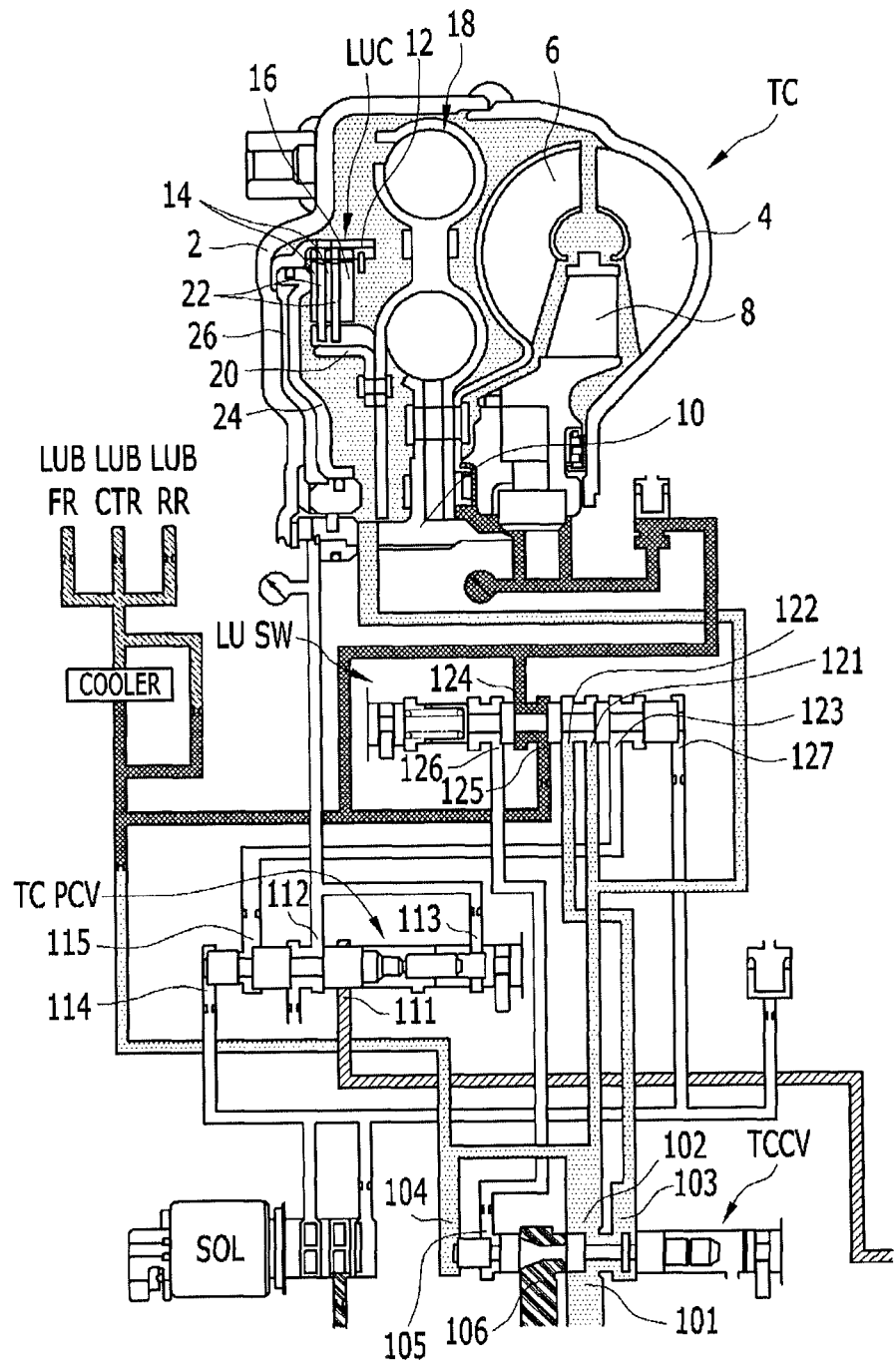
FIG. 1 is a diagram showing an exemplary circuit for controlling hydraulic pressure of a torque converter according to the present invention when a lock-up clutch is not operated.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

However, contents that are not associated with a description will be omitted in order to clearly describe exemplary embodiments of the present invention, and components that are the same as or are similar to each other will be denoted by the same reference numerals throughout the present specification.

In the following description, terms 'first', 'second', and the like, will be used to distinguish components having the same names from each other, and will not necessarily limited to a sequence thereof.

FIG. 1 is a diagram showing a circuit for controlling hydraulic pressure of a torque converter according to various embodiments when a lock-up clutch is not operated. Referring to FIG. 1, a torque converter (TC) is configured to include a front cover 2, an impeller 4, a turbine 6, and a stator 8.

The front cover 2 is connected to a crank shaft of an engine to rotate together with the engine. The impeller 4 is connected to the front cover 2 to rotate together with the front cover 2. The turbine 6 is disposed so as to face the impeller 4, and drives an input shaft of a transmission through a turbine hub 10 while rotating by a fluid supplied from the impeller 4.

The stator is disposed so as to rotate in only one direction by a one-direction clutch between the impeller 4 and the turbine 6, and changes a flow of a fluid (e.g., oil for an automatic transmission) coming out from the turbine 6 to transfer the fluid to the impeller 4. The stator 8 has the same rotation center or axis as that of the front cover 2.

In addition, a lock-up clutch LUC used as a means directly connecting the engine and the transmission to each other is disposed between the front cover 2 and the turbine 6. The lock-up clutch LUC includes a drum 12 fixed to the front cover 2 and a clutch plate 14 and a retaining plate 16 supported by the drum 12.

In addition, the lock-up clutch LUC includes a boss 20 connected to the turbine 6 through a damper assembly 18 fixed to the turbine 6 and a clutch disk 22 supported by the boss 20.

Further, the lock-up clutch LUC includes a piston 24 disposed at one side of the clutch plate 14, that is, an inner side of the front cover 2, and the clutch plate 14 and the clutch disk 22 are compressed by pressure of the piston 24, such that the lock-up clutch LUC becomes an engagement state.

In addition, an engagement hydraulic pressure chamber 26 is formed between the piston 24 and the front cover 2. When hydraulic pressure is supplied to the engagement hydraulic pressure chamber 26, the piston 24 moves to the right on the accompanying drawings, such that the lock-up clutch LUC is engaged, and when the hydraulic pressure of the engagement hydraulic pressure chamber 26 is exhausted, an engaged state of the lock-up clutch LUC is released.

The supply and the exhaust of the hydraulic pressure of the torque converter TC configured as described above are performed by a torque converter control valve TCCV, a torque converter pressure control valve TC PCV, a lock-up clutch switch valve LU SW, and/or a linear solenoid valve SOL.

The torque converter control valve TCCV, which is configured of a spool valve and controls line pressure supplied as operation hydraulic pressure of the torque converter TC to be stably decreased, is configured to adjust the hydraulic pressure while exhausting surplus hydraulic pressure in a process of receiving supplied line pressure or D range pressure and receive fed-back exhaust hydraulic pressure of the torque converter at the time of controlling the engagement of the lock-up clutch LUC to decrease supply hydraulic pressure of the torque converter.

To this end, the torque converter control valve TCCV is configured to include a valve body and a valve spool, wherein the valve body is configured to include a first port 101 having the line pressure supplied thereto, a second port 102 supplying hydraulic pressure supplied to the first port 101 to the lock-up switch valve LU SW, a third port 103 supplying the hydraulic pressure supplied to the first port 101 as operation hydraulic pressure of the lock-up switch valve LU SW and the torque converter TC, a fourth port 104 receiving the hydraulic pressure supplied to the second port 102 as control pressure, a fifth port 105 receiving the exhaust hydraulic pressure of the torque converter from the lock-up switch valve LU SW, and a sixth port 106 exhausting the hydraulic pressure supplied to the first port 101.

The valve spool is embedded in the valve body, and adjusts an opening area of the sixth port 106 while horizontally or laterally moving depending on a magnitude of control pressure supplied to the fourth and fifth ports 104 and 105, thereby controlling the hydraulic pressure.

The hydraulic pressure controlled by the torque converter control valve TCCV is supplied as operation pressure and cooling and lubricating hydraulic pressure of the torque converter TC through the lock-up switch valve LU SW.

The torque converter pressure control valve TC PCV is configured of a spool valve, and is configured to be controlled by control pressure supplied from the linear solenoid valve SOL to control engagement and disengagement pressure of the lock-up clutch LUC and receive the fed-back supply hydraulic pressure of the torque converter at the time of controlling the engagement of the lock-up clutch LU to control engagement hydraulic pressure of the lock-up clutch LUC.

To this end, the torque converter pressure control valve TC PCV is configured to include a valve body and a valve spool, wherein the valve body is configured to include a first port 111 having the D range pressure supplied thereto, a second port 112 supplying hydraulic pressure supplied to the first port 111 to the engagement hydraulic pressure chamber 26 of the lock-up clutch LUC, a third port 113 receiving the hydraulic pressure supplied to the second port 112 as control pressure, a fourth port 114 receiving control pressure of the linear solenoid valve SOL at an opposite side to the third port 113, a fifth port 115 receiving supply hydraulic pressure of the torque converter as control pressure from the lock-up switch valve LU SW, and an exhaust port EX selectively exhausting the hydraulic pressure of the second port 112.

The valve spool is embedded in the valve body, and is controlled by the control pressure of the linear solenoid valve SOL and the supply hydraulic pressure of the torque converter to adjust an opening area of the first port 111, thereby controlling engagement hydraulic pressure of the lock-up clutch supplied to the engagement hydraulic pressure chamber 26 of the lock-up clutch LUC.

The lock-up switch valve LU SW is configured of a spool valve, and is configured to be controlled by the control pressure of the linear solenoid valve SOL to allow the supply and the exhaust of the hydraulic pressure of the torque converter TC to be performed and switch a channel so that a portion of the exhaust hydraulic pressure of the torque converter is fed back to the torque converter control valve TCCV at the time of controlling the engagement of the lock-up clutch LUC.

The lock-up switch valve LU SW is configured to include a valve body and a valve spool, wherein the valve body is configured to include a first port 121 communicating with the second port 102 of the torque converter control valve TCCV, a second port 122 communicating with the third port 103 of the torque converter pressure control valve TC PCV, a third port 123 selectively connected to the first port 121 and communicating with the fifth port 115 of the torque converter pressure control valve TC PCV, a fourth port 124 receiving the exhaust hydraulic pressure of the torque converter, a fifth port 125 selectively connected to the fourth port 124 and communicating with a cooling and lubricating part, a sixth port 126 selectively connected to the fourth port 124 and connected to the fifth valve 105 of the torque converter control valve TCCV, and a seventh port 127 receiving the control pressure of the linear solenoid valve SOL.

The valve spool is embedded in the valve body, and is controlled by the control pressure of the linear solenoid valve SOL to allow the first port 121 to communicate with the third port 123, allow the second port 122 to communicate with the fifth port 125, and allow the fourth port 124 to communicate with the sixth port 126, or allow the first port 121 to communicate with the second port 122 and allow the fourth port 124 to communicate with the fifth port 125.

The linear solenoid valve SOL as described above is configured in a normal closed type, such that it does not generate the control pressure when power is not applied thereto.

In addition, the line pressure as described above indicates hydraulic pressure supplied from a line regulator valve, and the D range pressure as described above indicates hydraulic pressure supplied from a manual valve changing a range at the time of a D range.

The circuit for controlling hydraulic pressure of a torque converter according to various embodiments configured as described above has a hydraulic pressure flow as shown in FIG. 1 in a state in which the lock-up clutch LUC is not operated.

That is, the hydraulic pressure controlled by the torque converter control valve TCCV is supplied as the cooling and lubricating hydraulic pressure simultaneously with being supplied as the operation hydraulic pressure of the torque converter TC, and a portion of the hydraulic pressure is supplied to and waits in the lock-up switch valve LU SW.

In addition, the operation hydraulic pressure supplied to the torque converter TC is circulated by a process in which it is supplied to the cooling and lubricating part through an exhaust channel and the lock-up switch valve LU SW.

Figure 2:
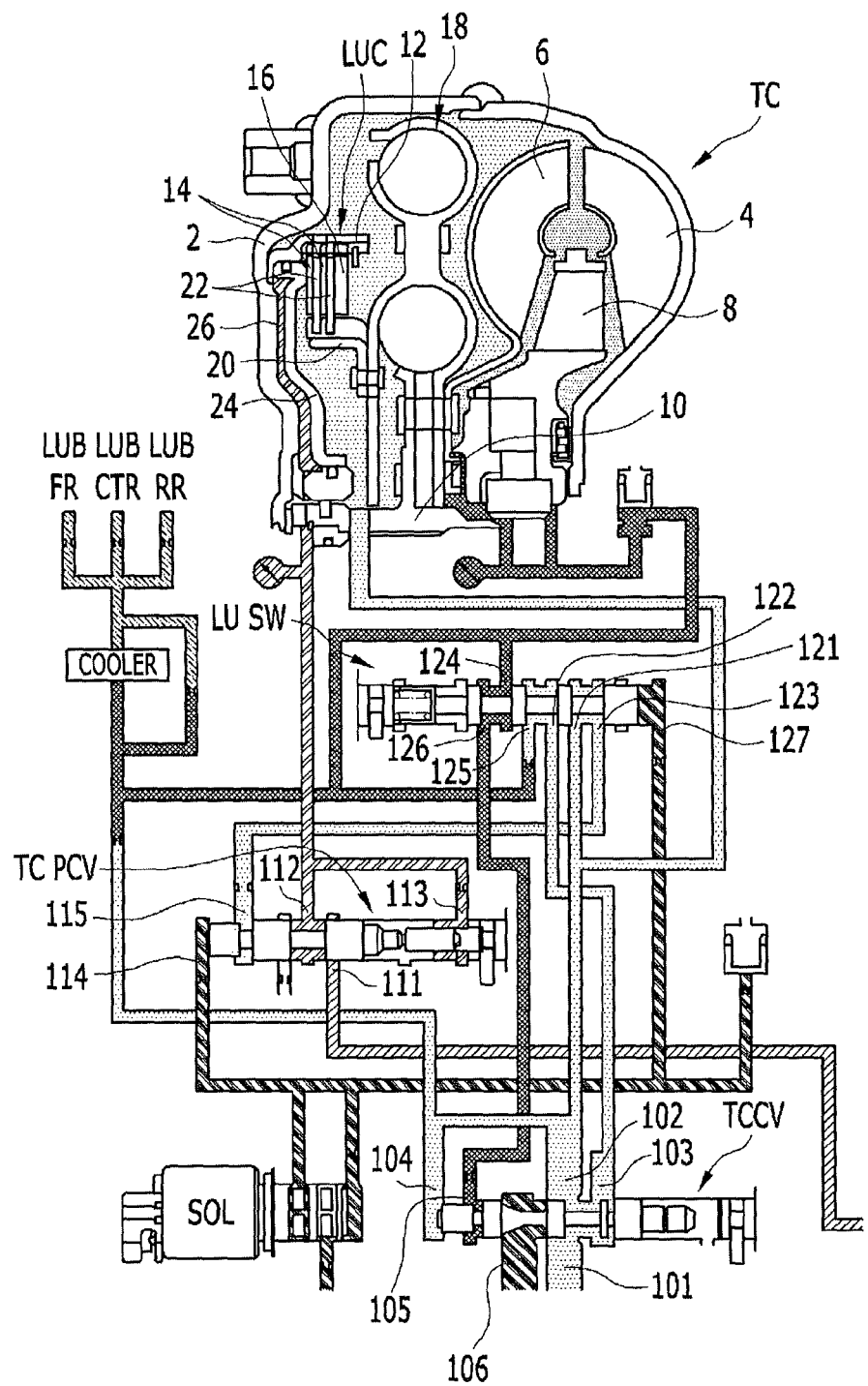
FIG. 2 is a diagram showing an exemplary circuit for controlling hydraulic pressure of a torque converter according to the present invention when a lock-up clutch is operated.

FIG. 2 is a diagram showing a circuit for controlling hydraulic pressure of a torque converter according to various embodiments when a lock-up clutch is operated. Referring to FIG. 2, when the linear solenoid valve SOL starts to be controlled (e.g., 1.0 bar) in order to control an operation of the lock-up clutch LUC, the valve spool of the lock-up switch valve LU SW moves to the left on the accompanying drawings, such that the channel is switched, and the torque converter pressure control valve TC PCV arrives at an equilibrium state.

Therefore, engagement pressure of the lock-up clutch LUC is formed, but is smaller than pressure in the torque converter TC, such that the lock-up clutch is not in an engaged state.

In this case, a portion of the exhaust hydraulic pressure of the torque converter is fed back to the fifth port 105 of the torque converter control valve TCCV by the switching of the channel by the lock-up switch valve LU SW, such that the supply hydraulic pressure of the torque converter is lowered.

In addition, the supply hydraulic pressure of the torque converter that is waiting in the lock-up switch valve LU SW is supplied as the control pressure of the torque converter pressure control valve TC PCV.

Then, when the linear solenoid valve SOL is further controlled (1.5 to 4.7 bar), the torque converter pressure control valve TC PCV is maintained in the equilibrium state, but the engagement pressure of the lock-up clutch LUC rises to operate the lock-up clutch LUC.

Since the exhaust hydraulic pressure of the torque converter is in proportion to supply pressure of the torque converter in the operation process as described above, when the supply pressure of the torque converter is lowered, the engagement pressure of the lock-up clutch LUC may also be lowered, such that an engagement response feature of the lock-up clutch may be improved.

As described above, the circuit for controlling hydraulic pressure of a torque converter according to various embodiments of the present invention, which is to control the lock-up clutch LUC of the torque converter TC having a 3-way separate chamber structure, is configured so that an engagement pressure supply channel of the lock-up clutch LUC is independently configured without being connected to another channel, such that it may be controlled by the linear solenoid valve SOL and the torque converter pressure control valve TC PCV.

For convenience in explanation and accurate definition in the appended claims, the terms "left" or "right", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A circuit for controlling hydraulic pressure of a torque converter, wherein the torque converter includes an engagement hydraulic pressure chamber independently installed in a fluid operation chamber enclosed by a front cover and an impeller and having engagement hydraulic pressure supplied thereto in order to engage a lock-up clutch, the circuit comprising:
   a torque converter control valve stably decreasing line pressure and supplying the decreased line pressure as operation hydraulic pressure of the torque converter;
   a torque converter pressure control valve controlled by a linear solenoid valve to control D range pressure and supply the controlled D range pressure to the engagement hydraulic pressure chamber; and
   a lock-up switch valve controlled by the linear solenoid valve to directly supply the hydraulic pressure supplied from the torque converter control valve connected to the lock-up switch valve as control pressure of the torque converter pressure control valve and supply exhaust hydraulic pressure of the torque converter as control pressure of the torque converter control valve.

2. The circuit for controlling hydraulic pressure of a torque converter of claim 1, wherein the torque converter control valve is configured to exhaust a portion of the line pressure, stably adjust the hydraulic pressure to supply the operation hydraulic pressure of the torque converter, and receive fed-back exhaust hydraulic pressure of the torque converter at the time of controlling the engagement of the lock-up clutch to decrease supply hydraulic pressure of the torque converter.

3. The circuit for controlling hydraulic pressure of a torque converter of claim 1, wherein the torque converter control valve includes:
   a valve body including a first port having the line pressure supplied thereto, a second port supplying hydraulic pressure supplied to the first port to the lock-up switch valve, a third port supplying the hydraulic pressure supplied to the first port to the lock-up switch valve and the torque converter, a fourth port receiving the hydraulic pressure supplied to the second port as control pressure, a fifth port receiving the exhaust hydraulic pressure of the torque converter from the lock-up switch valve, and a sixth port exhausting the hydraulic pressure supplied to the first port; and
   a valve spool embedded in the valve body and adjusting an opening area of the sixth port by moving laterally depending on a magnitude of control pressure supplied to the fourth and fifth ports.

4. The circuit for controlling hydraulic pressure of a torque converter of claim 1, wherein the linear solenoid valve is configured to be of a normal closed type.

5. The circuit for controlling hydraulic pressure of a torque converter of claim 1, wherein the torque converter pressure control valve is configured to be controlled by control pressure supplied from the linear solenoid valve to control engagement and disengagement pressure of the lock-up clutch and receive fed-back supply hydraulic pressure of the torque converter at the time of controlling the engagement of the lock-up clutch to control engagement hydraulic pressure of the lock-up clutch.

6. The circuit for controlling hydraulic pressure of a torque converter of claim 1, wherein the torque converter pressure control valve includes:
   a valve body including a first port having the D range pressure supplied thereto, a second port supplying hydraulic pressure supplied to the first port to the engagement hydraulic pressure chamber, a third port receiving the hydraulic pressure supplied to the second port as control pressure, a fourth port receiving control pressure of the linear solenoid valve at an opposite side to the third port, a fifth port receiving supply hydraulic pressure of the torque converter as control pressure from the lock-up switch valve, and an exhaust port selectively exhausting the hydraulic pressure of the second port; and
   a valve spool embedded in the valve body and controlled by the control pressure of the linear solenoid valve and the supply hydraulic pressure of the torque converter to adjust an opening area of the first port, thereby controlling engagement hydraulic pressure of the lock-up clutch supplied to the engagement hydraulic pressure chamber.

7. The circuit for controlling hydraulic pressure of a torque converter of claim 1, wherein the lock-up switch valve includes:
a valve body including first and second ports receiving the hydraulic pressure from the torque converter control valve, a third port supplying the hydraulic pressure supplied to the first port as the control pressure of the torque converter pressure control valve, a fourth port receiving the exhaust hydraulic pressure of the torque converter, a fifth port selectively supplying the hydraulic pressure supplied to the fourth port and the hydraulic pressure supplied to the second port to a cooling and lubricating part, a sixth port supplying the hydraulic pressure supplied to the fourth port as the control pressure of the torque converter control valve, and a seventh port receiving control pressure of the linear solenoid valve; and
a valve spool embedded in the valve body and controlled by the control pressure of the linear solenoid valve to allow the first port to communicate with the third port, allow the second port to communicate with the fifth port, and allow the fourth port to communicate with the sixth port, or allow the first port to communicate with the second port and allow the fourth port to communicate with the fifth port.

8. A circuit for controlling hydraulic pressure of a torque converter, wherein the torque converter includes an engagement hydraulic pressure chamber independently installed in a fluid operation chamber enclosed by a front cover and an impeller and having engagement hydraulic pressure supplied thereto in order to engage a lock-up clutch, the circuit comprising:
a torque converter control valve exhausting a portion of line pressure, stably adjusting hydraulic pressure to supply operation hydraulic pressure of the torque converter, and receiving fed-back exhaust hydraulic pressure of the torque converter at the time of controlling the engagement of the lock-up clutch to decrease supply hydraulic pressure of the torque converter;
a torque converter pressure control valve controlled by a linear solenoid valve to control engagement and disengagement pressure of the lock-up clutch and receiving fed-back supply hydraulic pressure of the torque converter at the time of controlling the engagement of the lock-up clutch to control engagement hydraulic pressure of the lock-up clutch; and
a lock-up switch valve controlled by the linear solenoid valve to directly supply the hydraulic pressure supplied from the torque converter control valve connected to the lock-up switch valve, as control pressure of the torque converter pressure control valve and supply exhaust hydraulic pressure of the torque converter as control pressure of the torque converter control valve.

9. The circuit for controlling hydraulic pressure of a torque converter of claim 8, wherein the torque converter control valve includes:
a valve body including a first port having the line pressure supplied thereto, a second port supplying hydraulic pressure supplied to the first port to the lock-up switch valve, a third port supplying the hydraulic pressure supplied to the first port to the lock-up switch valve and the torque converter, a fourth port receiving the hydraulic pressure supplied to the second port as control pressure, a fifth port receiving the exhaust hydraulic pressure of the torque converter from the lock-up switch valve, and a sixth port exhausting the hydraulic pressure supplied to the first port; and
a valve spool embedded in the valve body and adjusting an opening area of the sixth port by moving laterally depending on a magnitude of control pressure supplied to the fourth and fifth ports.

10. The circuit for controlling hydraulic pressure of a torque converter of claim 8, wherein the linear solenoid valve is configured to be of a normal closed type.

11. The circuit for controlling hydraulic pressure of a torque converter of claim 8, wherein the torque converter pressure control valve includes:
a valve body including a first port having the D range pressure supplied thereto, a second port supplying hydraulic pressure supplied to the first port to the engagement hydraulic pressure chamber, a third port receiving the hydraulic pressure supplied to the second port as control pressure, a fourth port receiving control pressure of the linear solenoid valve at an opposite side to the third port, a fifth port receiving supply hydraulic pressure of the torque converter as control pressure from the lock-up switch valve, and an exhaust port selectively exhausting the hydraulic pressure of the second port; and
a valve spool embedded in the valve body and controlled by the control pressure of the linear solenoid valve and the supply hydraulic pressure of the torque converter to adjust an opening area of the first port, thereby controlling engagement hydraulic pressure of the lock-up clutch supplied to the engagement hydraulic pressure chamber.

12. The circuit for controlling hydraulic pressure of a torque converter of claim 8, wherein the lock-up switch valve includes:
a valve body including first and second ports receiving the hydraulic pressure from the torque converter control valve, a third port supplying the hydraulic pressure supplied to the first port as the control pressure of the torque converter pressure control valve, a fourth port receiving the exhaust hydraulic pressure of the torque converter, a fifth port selectively supplying the hydraulic pressure supplied to the fourth port and the hydraulic pressure supplied to the second port to a cooling and lubricating part, a sixth port supplying the hydraulic pressure supplied to the fourth port as the control pressure of the torque converter control valve, and a seventh port receiving control pressure of the linear solenoid valve; and
a valve spool embedded in the valve body and controlled by the control pressure of the linear solenoid valve to allow the first port to communicate with the third port, allow the second port to communicate with the fifth port, and allow the fourth port to communicate with the sixth port, or allow the first port to communicate with the second port and allow the fourth port to communicate with the fifth port.

* * * * *